(12) United States Patent
Ueyama et al.

(10) Patent No.: US 7,136,580 B2
(45) Date of Patent: Nov. 14, 2006

(54) PACKAGING BAG AND LENS-FITTED PHOTO FILM UNIT

(75) Inventors: Shigeaki Ueyama, Tokyo (JP); Miho Takiguchi, Tokyo (JP); Daisuke Sato, Tokyo (JP); Yasuo Matsumoto, Kanagawa (JP); Hideo Tomizawa, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 74 days.

(21) Appl. No.: 10/919,357

(22) Filed: Aug. 17, 2004

(65) Prior Publication Data

US 2005/0053373 A1    Mar. 10, 2005

(30) Foreign Application Priority Data

Aug. 18, 2003  (JP) .............................. 2003-294598

(51) Int. Cl.
*G03B 17/03* (2006.01)
*B65D 85/38* (2006.01)

(52) U.S. Cl. ...................................... 396/6; 206/316.2
(58) Field of Classification Search .................... 396/6, 396/448; 206/316.2, 316.1
See application file for complete search history.

(56) References Cited

U.S. PATENT DOCUMENTS 5,337,099 A * 8/1994 Tasaka et al. .................. 396/6
5,350,062 A * 9/1994 Takiguchi et al. ....... 206/316.2
5,738,211 A * 4/1998 Ichino et al. ............ 206/316.2
6,195,507 B1   2/2001 Ito et al. ........................ 396/6

FOREIGN PATENT DOCUMENTS

| EP | 1 024 397 A2 |   | 8/2000 |
|----|---|---|---|
| JP | 05-204042 |   | 8/1993 |
| JP | 05204042 A | * | 8/1993 |
| JP | 07-104436 |   | 4/1995 |
| JP | 08-334869 |   | 12/1996 |
| JP | 2002-341493 |   | 11/2002 |

* cited by examiner

*Primary Examiner*—W. B. Perkey
*Assistant Examiner*—Rishi Suthar
(74) *Attorney, Agent, or Firm*—Young & Thompson

(57) ABSTRACT

A packaging bag contains a lens-fitted photo film unit in a pillow-type package. Optically transparent window sections are provided on front top and bottom portions of the packaging bag. And a belt-like shaped lightproof section is provided in a center portion of the window section. The window section is made translucent by printing a half-tone dot meshing with a white coating, so that the lens-fitted photo film unit is observable through the window section. The lightproof section is printed with a lightproof coating and covers the front of the taking lens. Opaque coating is printed on an opaque section, which is a portion except the window section and the lightproof section.

17 Claims, 6 Drawing Sheets

PACKAGING BAG AND LENS-FITTED PHOTO FILM UNIT

BACKGROUND OF THE INVENTION

1. Field of the Invention

The present invention relates to a lens-fitted photo film unit and a packaging bag for packaging the lens-fitted photo film unit.

2. Background Arts

A lens-fitted photo film unit is known as a handy camera preloaded with unexposed photo film. A so-called knocking-type shutter device has been adopted to the lens-fitted photo film unit to simplify its structure.

The lens-fitted photo film unit is packaged in a packaging bag called a gusset bag as disclosed in Japanese Patent Laid Open Publication No. 5-204042, No. 7-104436, and No. 2002-341493. The gusset bag contains the lens-fitted photo film unit in an airtight fashion by shaping a moisture-proof packaging material into a rectangular shape and applying a sealing process, in which both side edge portions of the packaging material are overlapped and sealed. Ornamental printing, which includes a product logo and designs of patterns, etc., is often printed on the opposite side of a sealing section, to which the sealing process is applied, of the gusset bag.

A taking lens of the lens-fitted photo film unit may be damaged due to a shock of falling or colliding against another product during distribution. In view of the above problem, Japanese Patent Laid Open Publication No. 5-204042 discloses that the sealing section of the gusset bag is formed to cover the taking lens of the lens-fitted photo film unit for protection.

The conventional gusset bag uses a film, which is made of aluminum foil overlaid with a thin resin layer, as a packaging material being resistant to light and moisture. Therefore, the lens-fitted photo film unit is not observable through the conventional gusset bag. However, a packaged product with an excellent appearance is preferred recently.

In view of the above problems, a packaging bag for the lens-fitted photo film unit disclosed in Japanese Patent Laid Open Publication No. 7-104436 uses a packaging material made of laminated transparent films, and has a transparent window section formed in a portion covering the front of the lens-fitted photo film unit. The packaging material except the transparent window section is printed with opaque ink. A user can observe the lens-fitted photo film unit through the transparent window section. Accordingly the packaged product enhances its appearance by the excellent design of the lens-fitted photo film unit through the transparent window section.

A shutter blade of the lens-fitted photo film unit may be opened by, for instance, the shock of falling during distribution. Therefore, when an optically transparent packaging material is used for the packaging bag, a first frame of the photo film may be exposed by daylight through the taking lens in case that the shutter blade is accidentally opened. In view of the above problems, Japanese Patent Laid Open Publication No. 2002-341493 discloses the use of an opaque cap, which is attached to the taking lens of the lens-fitted photo film unit, along with the use of the transparent gusset bag in order to prevent the photo film from being exposed accidentally.

The lens-fitted photo film unit and the packaging bag, which contains the lens-fitted photo film unit, are expected to have improved design quality and enhanced appearance. However, Japanese Patent Laid Open Publication No. 5-204042 has not touched upon ornamental and design aspects of the packaging bag. Further, Japanese Patent Laid Open Publication No. 7-104436 and No. 2002-341493 merely disclose the transparent window section of the packaging bag to make the lens-fitted photo film unit observable from outside, so that whole design of the packaged product cannot be improved unless the lens-fitted photo film unit itself has an excellent design.

Further, the gusset bag provided with the transparent window is disclosed in Japanese Patent Laid-Open Publication No. 7-104436 and No. 2002-341493. However, when using the above-mentioned gusset bag, the film may be deteriorated due to heat-induced fog, or parts of the lens-fitted photo film unit may be deformed due to heat, as temperature inside the gusset bag rises while daylight passes through the transparent window section of the gusset bag. Therefore, the lens-fitted photo film unit packaged in the above-mentioned gusset bag cannot be displayed in a place exposed to direct sunlight such as outdoors, but is sold only in indoor shops.

Furthermore, when a transparent packaging bag is used, an operation member for switching on/off a flash circuit, which is provided on the front of the lens-fitted photo film unit, is also observed from outside. When the lens-fitted photo film unit packaged in the transparent packaging bag is displayed in the shop, the operation member may be pushed to turn on the flash circuit so that its power source may be wasted.

Therefore, the packaging bag for the lens-fitted photo film unit disclosed in the above references has difficulties in improving the design quality. Further, the conventional packaging bag lacks proper measures to prevent heat, light, and a waste of the power source, so that the lens-fitted photo film unit packaged in the above-mentioned packaging bag cannot be displayed outdoors.

SUMMARY OF THE INVENTION

An object of the present invention is to provide a packaging bag with improved design quality.

Another object of the present invention is to provide the packaging bag implementing preventive measures against heat, light, and a waste of a power source in order to be able to be displayed outdoors.

Still another object of the present invention is to provide the packaging bag and a lens-fitted photo film unit implementing preventive measures against heat, light, and a waste of the power source while using an optically transparent packaging material.

To achieve the above objects, the packaging bag according to the present invention comprises a transparent window section to make at least a part of a lens-fitted photo film unit observable. A lightproof overlapping section is formed across the window section to cover a taking lens of the lens-fitted photo film unit packaged in the packaging bag. The overlapping section is placed adjacent to one of both side edge portions of a sheet-type material for making the packaging bag, and extends along the side edge portion. A sealing section is folded to overlap on the overlapping section. The sealing section is formed by adhering insides of the both side edge portions that have lightproof property.

According to a preferred embodiment of the present invention, the overlapping section is placed across the window section to separate the window section in two parts. A lightproof coating is printed on both side edge portions and overlapping section. An operating member of the lens-fitted photo film unit is covered by an opaque section so as not to be observable from outside. An opaque coating is printed on the opaque section. The window section makes a part of a front cover of the lens-fitted photo film unit observable. The front cover is made of white plastic, which reflects sunlight passed through the window section, in order to prevent a temperature rise inside the packaging bag.

The packaging bag has a tube-shape, which is formed by adhering the both side edge portions of the sheet material, and both ends of the tube of the sheet material are sealed. The sheet material is made of an inner plastic film layer and an outer plastic film layer both with light transmittance. Various printing is applied to the inner plastic film layer. The lightproof coating is printed on the sealed section and the overlapping section. The opaque coating is printed on the opaque section. A white coating, half-tone dot meshing, or a matte coating is printed on the window section.

BRIEF DESCRIPTION OF THE DRAWINGS

The above objects and advantages of the present invention will become apparent from the following detailed descriptions of the preferred embodiments when read in association with the accompanying drawings, which are given by way of illustration only and thus do not limit the present invention. In the drawings, the same reference numerals designate like or corresponding parts throughout the several views, and wherein.

DETAILED DESCRIPTION OF THE EMBODIMENTS

Figure 1:
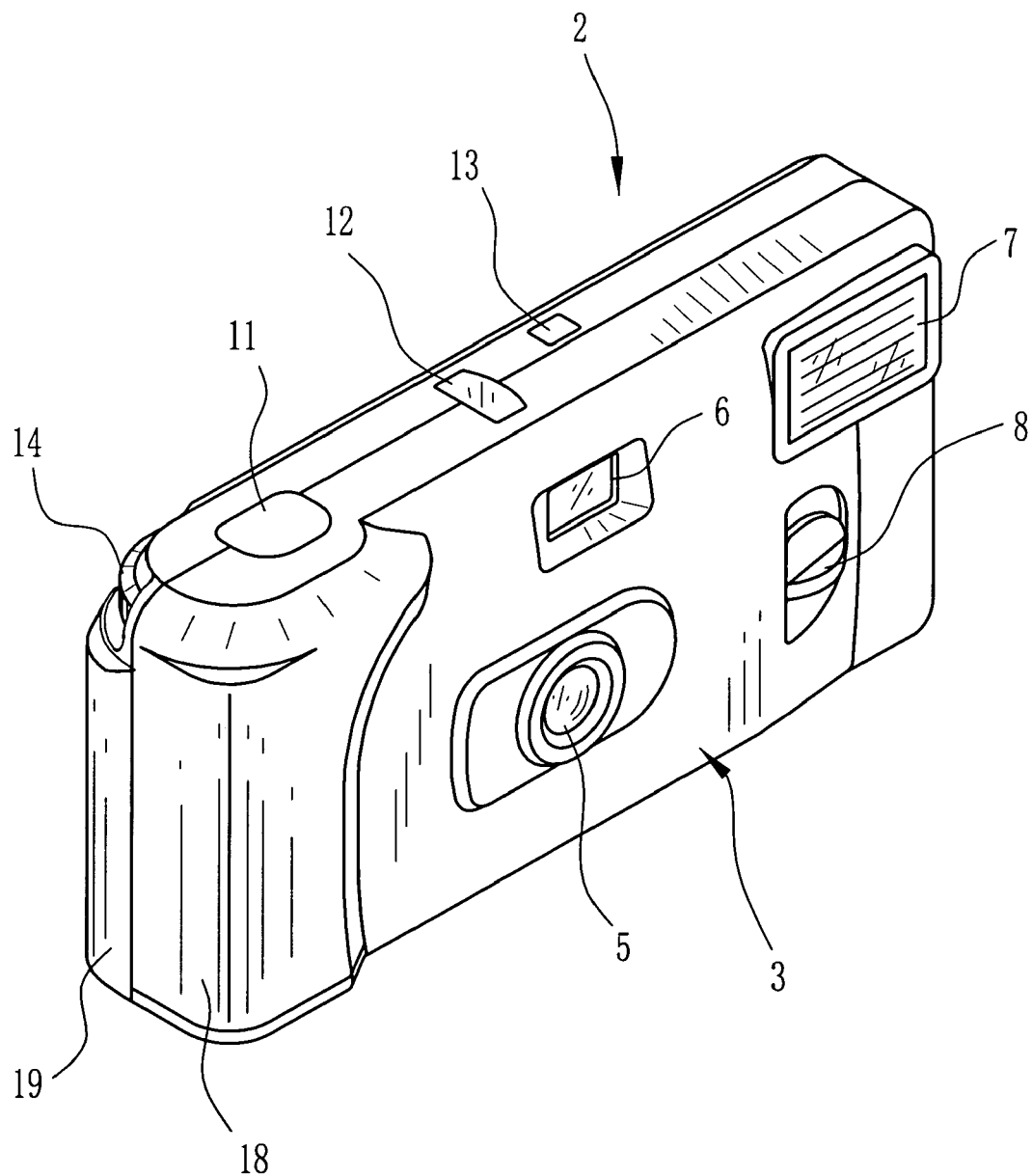
FIG. 1 is a perspective view of a lens-fitted photo film unit.

As shown in FIG. 1, a taking lens 5, an objective view finder 6, a flash emitter 7, and a flash operating knob 8 are provided on the front of a unit body 3 of a lens-fitted photo film unit 2. A shutter release button 11, a frame counter 12 for indicating remaining available frames, and a light guide 13 for indicating charging of a flash circuit are provided on a top face of the unit body 3. A winder wheel 14 and an eyepiece window (not shown) are provided on the back of the unit body 3.

Figure 2:
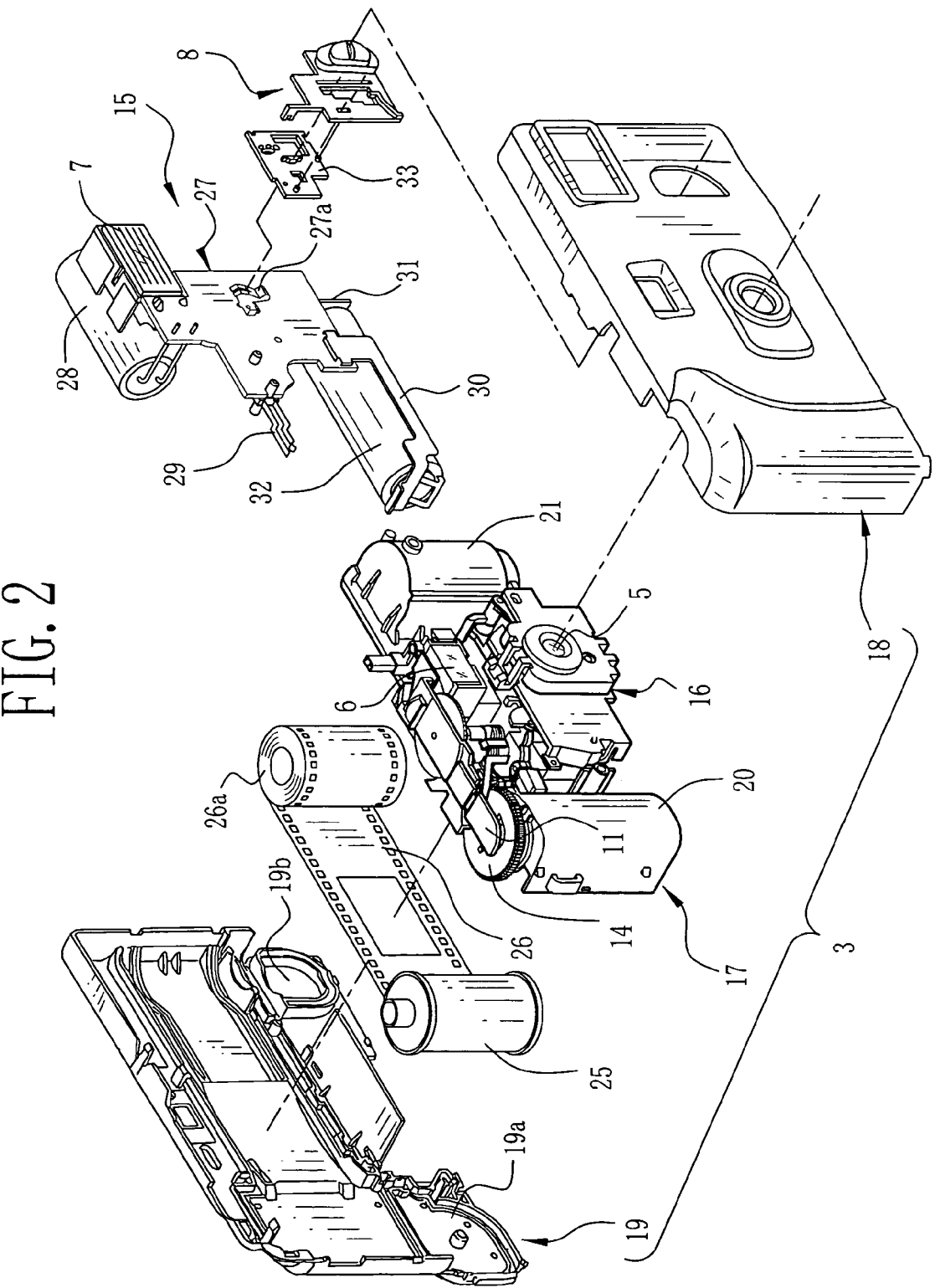
FIG. 2 is an exploded perspective view of the lens-fitted photo film unit.

As shown in FIG. 2, the unit body 3 includes a unit base 17, a front cover 18, and a rear cover 19. A flash unit 15 and an exposure mechanism 16 are incorporated in the unit base 17. The front and the rear covers 18 and 19 constitute an outer cover, and are mounted so as to cover the front and the rear of the unit base 17.

Openings for exposing the taking lens 5, the objective view finder 6, the flash emitter 7, and the flash operating knob 8 are provided in the front cover 18. The front cover 18 is molded of white-colored resin in order to prevent heat absorption by receiving direct sunlight.

A cartridge chamber 20, which is placed on the left side of the unit base 17, a film roll chamber 21, which is placed on the right side of the unit base 17, and an aperture 22 (see FIG. 4), which is placed between the cartridge chamber 20 and the film roll chamber 21, are integrated in the unit base 17. The exposure mechanism 16, which includes the taking lens 5 and the shutter blade 23 (see FIG. 4), is provided in front of the aperture 22. Further, the flash unit 15 is mounted between the exposure mechanism 16 and the film roll chamber 21 by hooks. Furthermore, a film cartridge 25 is loaded in the cartridge chamber 20. A film roll 26a, formed by rolling a photo film 26, is loaded in the film roll chamber 21. In an upper portion of the cartridge chamber 20, the winding wheel 14 is rotatably attached. A shaft member, which is integrated in the lower portion of the cartridge chamber 20, is engaged to a spool of the film cartridge 25 which is contained in the cartridge chamber 20. An exposed photo film 26 is wound up in the film cartridge 25 by rotating the winder wheel 14 in a counterclockwise direction in the drawing.

The rear cover 19 is mounted so that the back of the unit base 17 is covered. A film passage way is formed between the rear cover 19 and the unit base 17. The film passage way leads to the cartridge chamber 20 from the film roll chamber 21 through the back of the aperture 22. The photo film 26 is wound up in the film cartridge 25, which is loaded inside the cartridge chamber 20, from the film roll chamber 21 through the film passage way. Further, bottom lids 19a and 19b are formed in the bottom section of the rear cover 19. The bottom sections of the cartridge chamber 20 and the film roll chamber 21 are shut by the bottom lids 19a and 19b respectively in a light-tight fashion.

The flash emitter 7, a main capacitor 28, a synch switch 29, and a pair of electrode contacts 30 and 31 are incorporated in a circuit board 27 as a unit to constitute the flash unit 15. Each of one end of the electrode contacts 30 and 31 are connected to the circuit board 27, and the other ends hold the battery 32 which feeds the flash unit 15.

A support plate 33 and the flash operating knob 8 are mounted on the front of the circuit board 27. When the flash operating knob 8 is slid up from a normal position to a charging position, which is placed above a normal position, a protrusion (not shown) formed at the rear of the flash operating knob 8 depresses a metal contact 27a provided on the circuit board 27 to turn on the flash circuit. Then, the flash circuit is turned on and charging of the main capacitor 28 is started. When the shutter release button 11 is depressed to actuate the exposure mechanism 16, the shutter blade 23 is rotated and contacts the synch switch 29. Thereby, the synch switch 29 is turned on to emit flash light.

Figure 3:
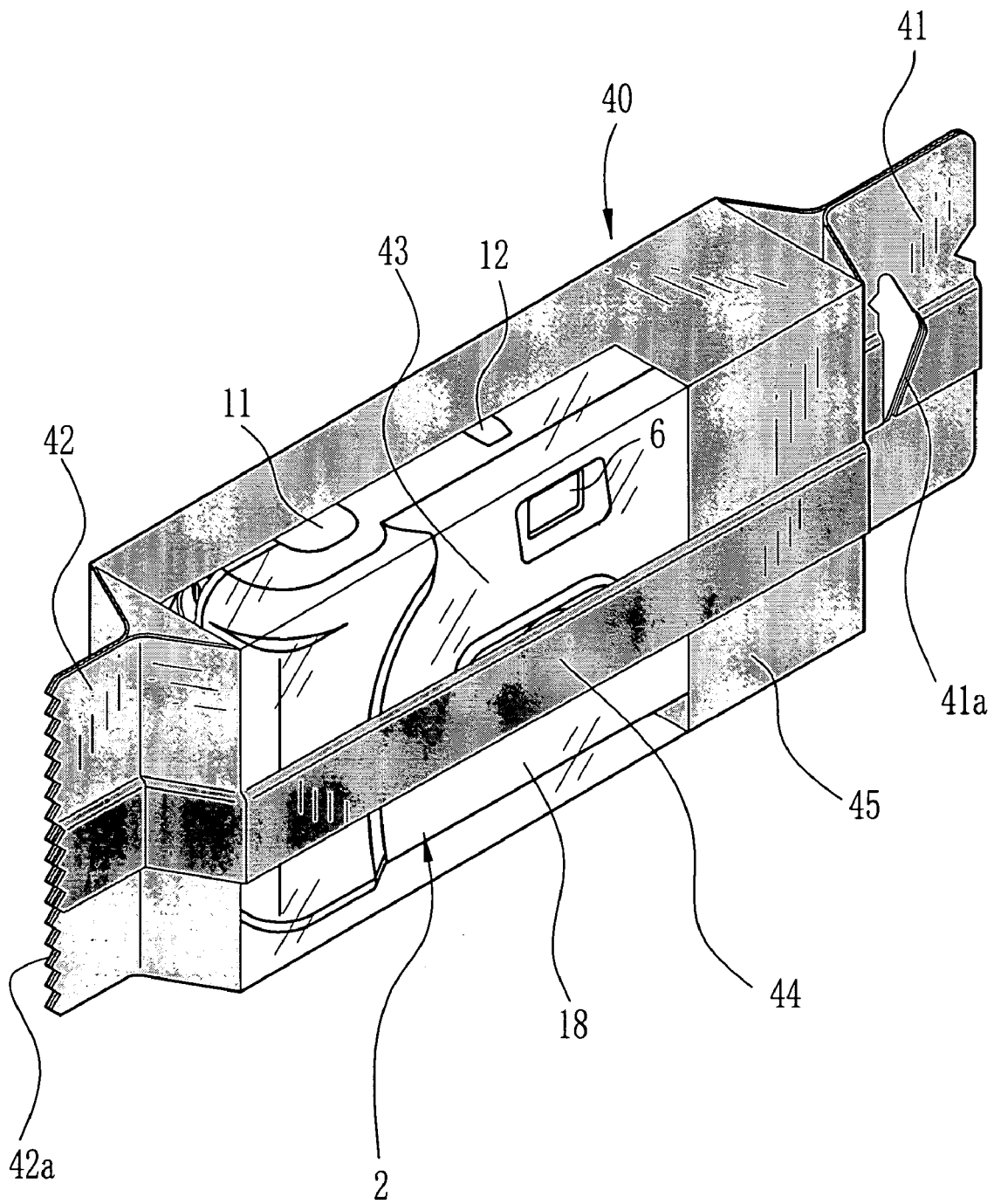
FIG. 3 is a perspective view of a packaging bag and the lens-fitted photo film unit packaged in the packaging bag.
Figure 4:
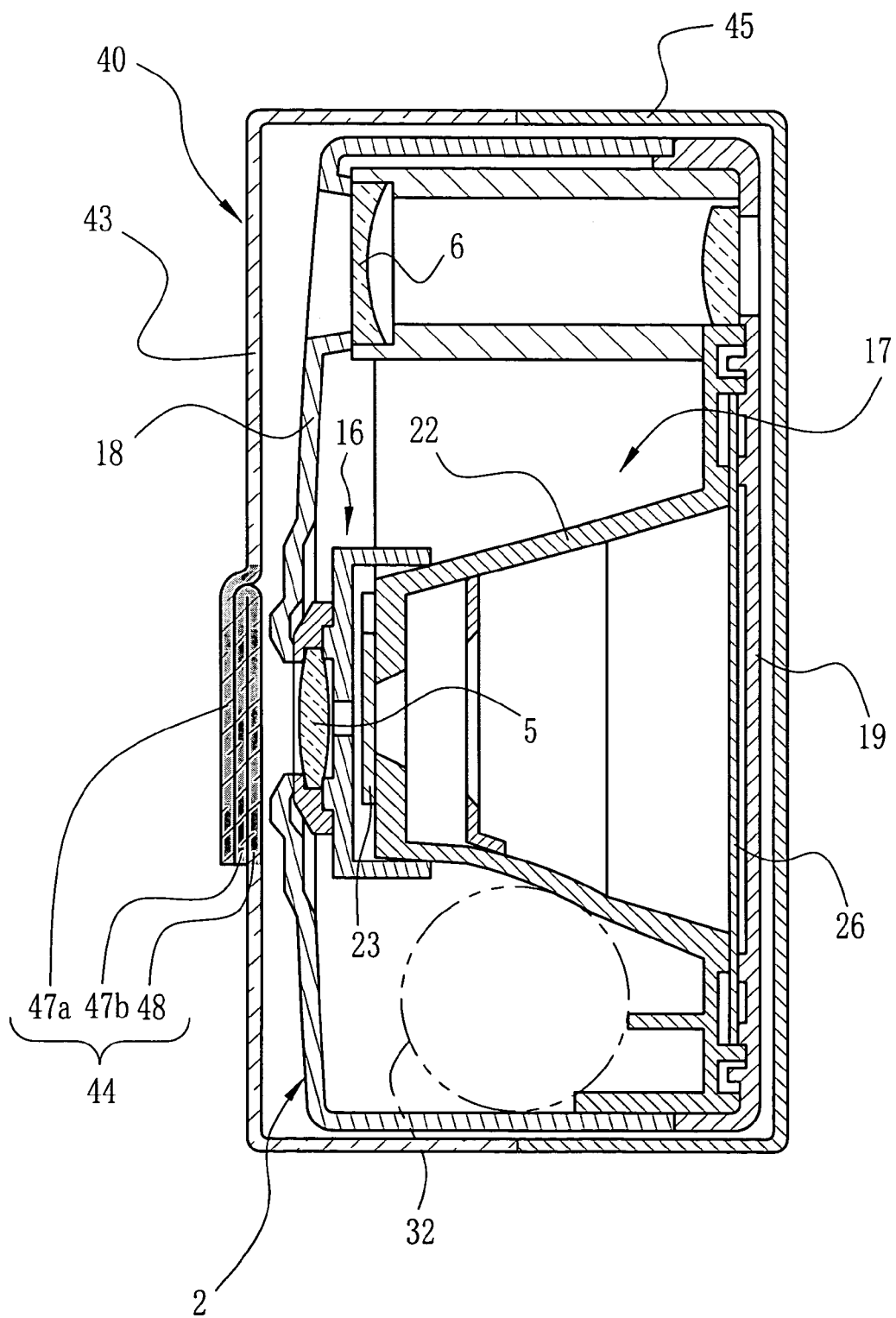
FIG. 4 is a schematic section view of the packaging bag and the lens-fitted photo film unit packaged in the packaging bag.

As shown in FIG. 3 and FIG. 4, the lens-fitted photo film unit 2 is packaged by a packaging bag 40 in a so-called pillow-type package in an airtight fashion. Projections 41 and 42 are provided on both ends of the packaging bag 40. Optically transparent window sections 43 are provided on the front, the top, and the bottom portions of the packaging bag 40. A belt-shaped lightproof section 44 is provided in the center of the window section 43. The projection 41 has a through-hole 41a to hang the packaging bag 40 on a hanger. An edge portion 42a of the other projection 42 has notches to make the packaging bag 40 easy to open. Most of the front of the lens-fitted photo film unit 2, in which the window section 43 is formed, is observable from outside. However, the right portion of the lens-fitted photo film unit 2 including the flash operating knob 8 is not observable, because it is covered by an opaque section 45. The opaque section 45 is printed with opaque ink.

Ornamental printing, such as a product logo and designs of patterns, etc., is applied to a portion covering the front of the lens-fitted photo film unit 2, in which the lightproof section 44 and the window section 43 are placed (not shown).

The lightproof section 44 is provided on a position to cover the taking lens 5 of the lens-fitted photo film unit 2 as shown in FIG. 4. As will be described later, the lightproof section 44 includes sealing sections 47a and 47b and an overlapping section 48 on which the sealing sections 47a and 47b are overlapped. Sealing sections 47a and 47b are formed by the sealing process when a packaging material 46 (see FIG. 5) is shaped into the packaging bag 40 by the pillow-type packaging.

Figure 5:
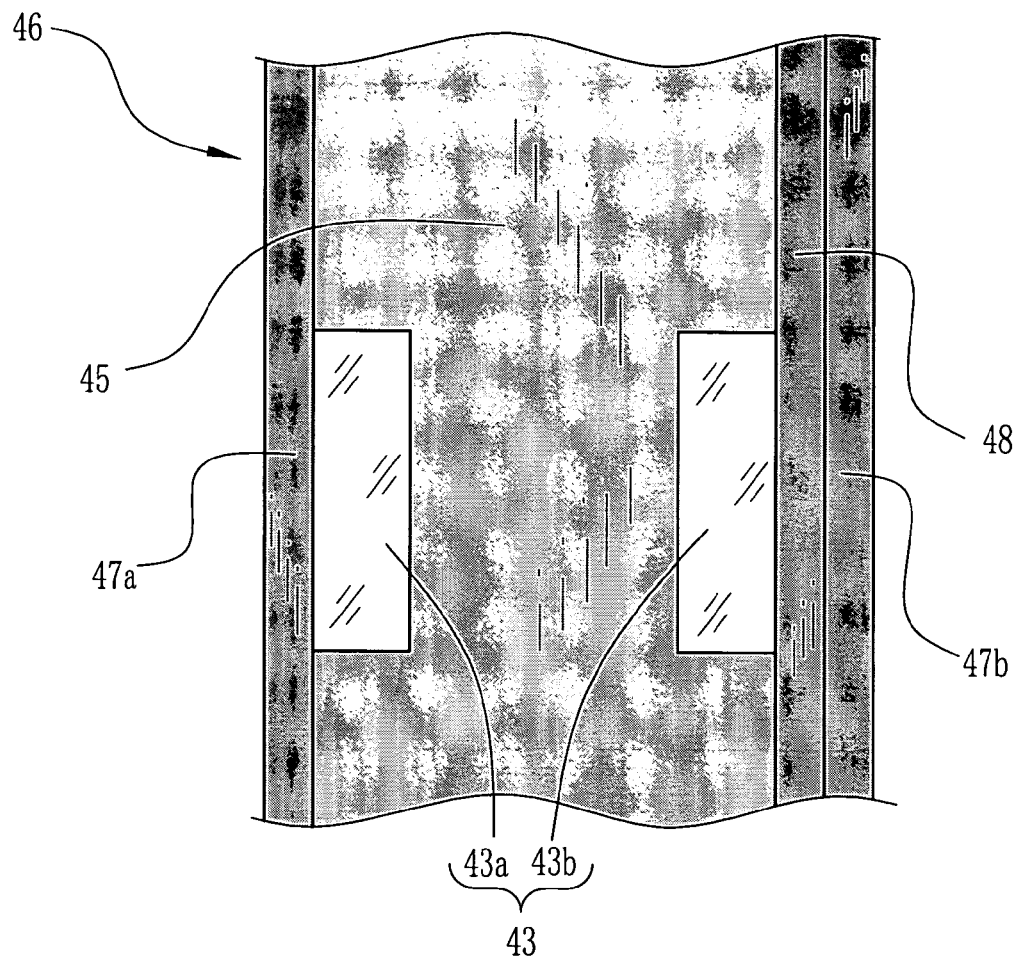
FIG. 5 is a developed view showing a packaging material used for forming the packaging bag.

As shown in FIG. 5, the packaging material 46 has a long belt-like shape. Each sealing section 47a and 47b has predetermined width from each side edge portion of the packaging material 46. The overlapping section 48 is adjacent to the sealing section 47a. The window section 43 is separated to window sections 43a and 43b arranged on both sides of the packaging material 46 respectively. The opaque section 45 is arranged on a portion except the lightproof section 44 and the window section 43.

Figure 6:
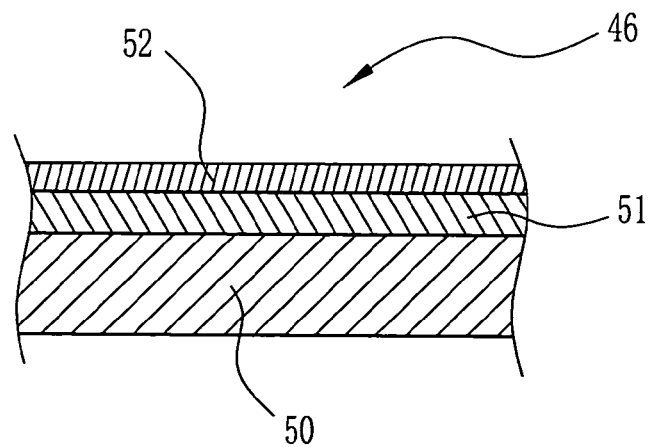
FIG. 6 is a section view showing a layer configuration of the packaging material.

In FIG. 6, the packaging material 46 has a surface to contact outside air, which is shown as an upper portion of the drawing, and an undersurface to contact the lens-fitted photo film unit 2, which is shown as a lower portion of the drawing. The packaging material 46 is constituted of a plastic film layer 50, a printed ink layer 51 which is overlaid on the plastic film layer 50, and a PET (polyethylene terephthalate) film layer 52 which is overlaid on the printed ink layer 51. The plastic film layer 50 is made of ceramic-evaporated film, PE (polyethylene) film, or the like.

Among the above-mentioned layers forming the packaging material 46, the plastic film layer 50 and the PET film layer 52 are transparent film layers. Only printed ink layer 51 is printed with different coatings on the window section 43, the lightproof section 44, and the opaque section 45 respectively. Each section has different function according to the difference in each coating.

The printed ink layer 51 of the window section 43 is formed by printing half-tone dot meshing with white coating. Thereby, the window section 43 becomes translucent, that is, light transmittance becomes low compared to the transparent film layer. The inside of the packaging bag 40 is observable from outside through the window section 43. Further, the printed ink layer 51 of the lightproof section 44 including the sealing sections 47a and 47b and the overlapped section 48 is formed by printing with lightproof coating without crevices. Thereby, outside light cannot enter into the packaging bag 40 through the lightproof section 44. Further, opaque coating is printed on the opaque section 45 so that the inside of the packaging bag cannot be observed from the outside.

Figure 7A:
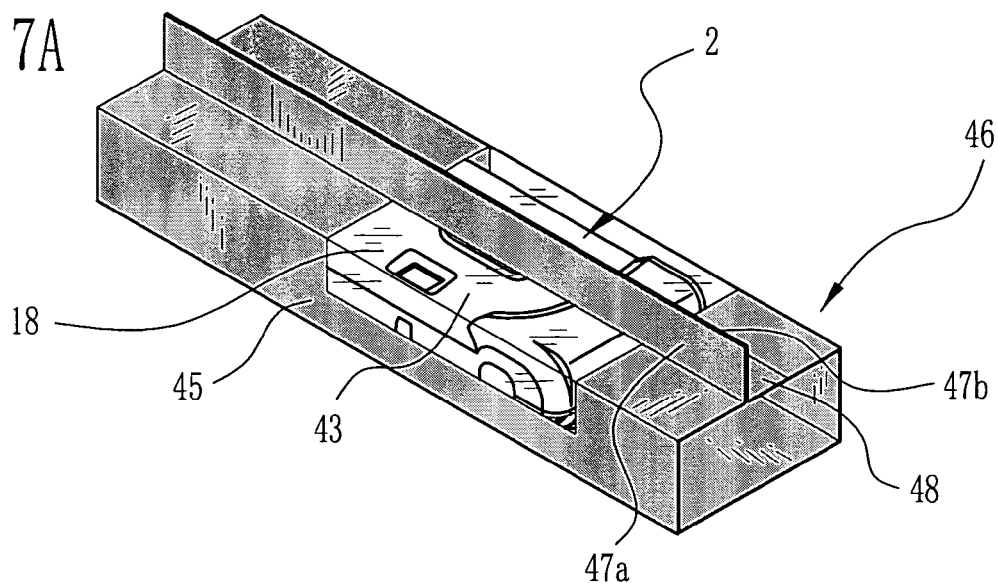
FIG. 7 is an explanatory view showing the steps of packing the lens-fitted photo film unit in the packaging bag by a pillow-type packaging method.
Figure 7B:
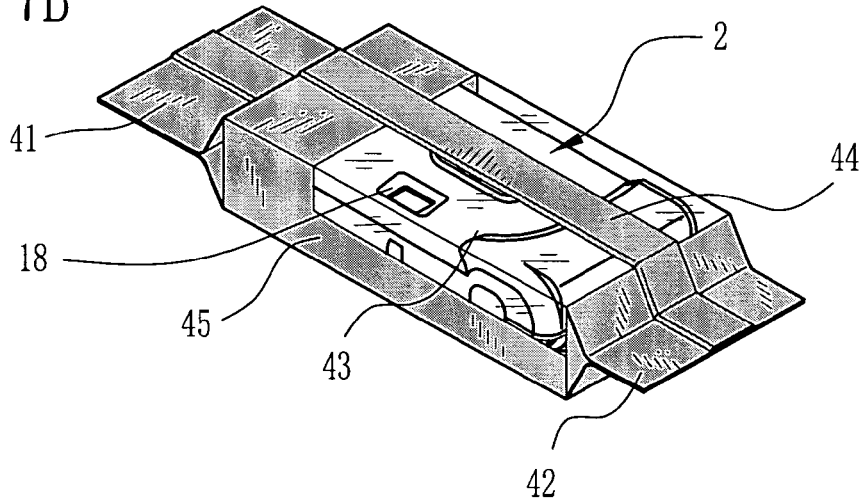
Figure 7C:
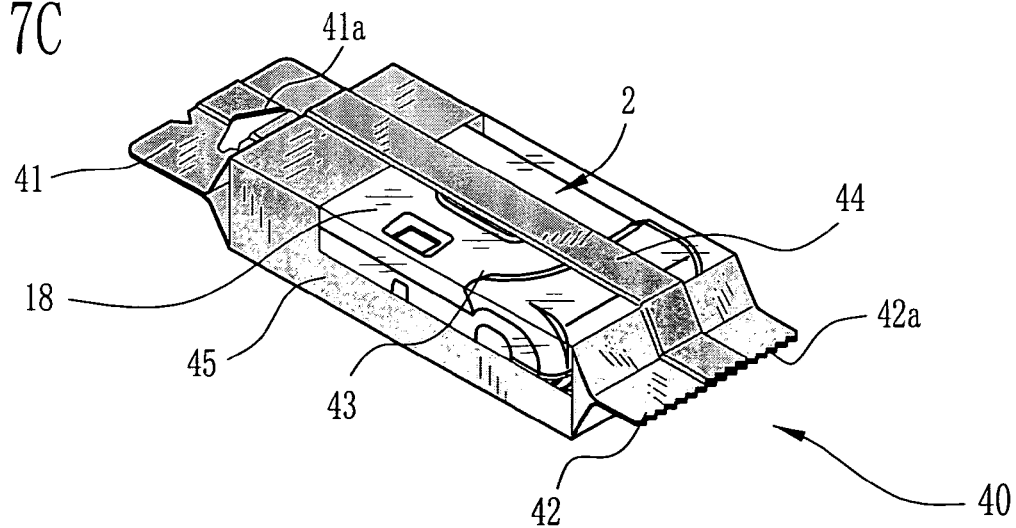

Referring to FIG. 7, the steps of packaging the lens-fitted photo film unit 2 in the packaging bag 40 by the pillow-type packaging are described. As shown in FIG. 7A, the packaging material 46 is initially formed into a rectangular tube such that the lens fitted photo film unit 2 is wrapped in the tube. Thereafter, the sealing sections 47a and 47b, that are located on both side edges of the packaging material 46 respectively, are joined together and sealed, as center sealing process, as shown in FIG. 7B. When applying the center sealing process, the sealing sections 47a and 47b are folded down to overlay on the overlapping section 48. Further, the projections 41 and 42 are formed by known cross sealing process, in addition to the center sealing process. Then, as shown in FIG. 7c, the projections 41 and 42 are cut to form the through hole 41a in the projection 41 and the notch 42a in the projection 42 respectively. Thus, the production of the packaging bag 40 is completed.

An operation of the above-configuration is described. The lens-fitted photo film unit 2 packaged in the packaging bag 40 is supplied on the market. As described above, the window section 43 is made translucent by printing half-tone dot meshing with the white coating. As a result, the packaging bag 40 can have expensive-looking while allowing users to observe an excellent design of the lens-fitted photo film unit 2. Further, ornamental printing is applied on the front of the packaging bag 40. And the lightproof section 44, including the sealed positions 47a and 47b, is arranged in a shape of line across the center of the front of the packaging bag 40. Therefore, the packaging bag 40 can have an excellent appearance that differs from the conventional packaging bag.

When the lens-fitted photo film unit 2 packaged in the packaging bag 40 is displayed outside, it is exposed to direct sunlight. However, the lightproof section 44 having three layers of the sealing sections 47a and 47b and the overlapping section 48 cover the taking lens 5, so that the taking lens 5 is securely shielded from light. Therefore, even if the shutter blade 23 is accidentally opened and closed, the photo film 26 is not exposed to light.

Further, the front cover 18, which is observable from the translucent window section 43, is formed of white resin in order to prevent evolution of radiant heat due to heat absorption of the front cover 18 in direct sunlight. As a result, it becomes possible to prevent temperature rise inside the packaging bag 40, so that the deterioration of the photo film 26 due to heat-induced fog and the deformation of each member of the lens-fitted photo film unit 2 due to heat are prevented.

Since the flash operating knob 8 is covered by the opaque section 45, it is difficult to recognize a position of the flash operating knob 8 from outside the packaging bag 40. Therefore, switching operation of the operating knob 8 is avoided and the flash circuit remains off, so that a waste of the battery 32, which is the power source, is prevented.

In the above example, the opaque section 45 only covers flash operating knob 8. However, it is also possible to cover the shutter release button 11 and the winder wheel 14 by the opaque section 45.

Further, the flash operating knob 8 is covered by the opaque section 45 which is the portion of the packaging material 46 printed with opaque coating. Instead, a protection member for protecting the lens-fitted photo film unit 2, for instance, a paper tray, may be contained inside the packaging bag 40. The paper tray can also cover the flash operating knob 8.

Furthermore, in the above embodiment, the window section 43 of the packaging material 46 is made to be translucent, that is, a condition with lower light transmittance, by printing the half-tone dot meshing with the coating. However, it is also possible to print the packaging material 46 with matte varnish (or matte coating). In addition, a matte film layer made of matte PET resin can be used as the PET film layer 52, which is the surface of the packaging material 46, to overlay on the plastic film layer 50. The plastic film layer 50 can be translucent as long as it has light transmittance.

Although the present invention has been described with respect to the preferred embodiment, the preset invention is not to be limited to the above embodiment but, on the contrary, various modifications will be possible to those skilled in the art without departing from the scope of claims appended hereto.

What is claimed is:

1. A packaging bag for packaging a lens-fitted photo film unit, said packaging bag having a tube-shape made of a sheet-type material, both end portions of said packaging bag being sealed for wrapping said lens-fitted photo film unit, said packaging bag comprising:

a sealing section for shaping said sheet-type material into said tube-shape, said sealing section being formed by adhering insides of both side edge portions having lightproof property of said sheet-type material, a lightproof overlapping section being formed in a shape of line adjacent to one of said side edge portions of said sheet-type material, said sealing section being folded down to overlay on said overlapping section, said overlapping section covering a taking lens of said lens-fitted photo film unit packaged by said packaging bag;

a transparent window section for making at least a part of said lens-fitted photo film unit observable from outside; and an opaque section surrounding said window section, said opaque section being a portion except said sealing section and said overlapping section.

2. A packaging bag as claimed in claim 1, wherein said overlapping section is placed across said window section, so as to separate said window section in two parts.

3. A packaging bag as claimed in claim 2, wherein a lightproof coating is printed on said both side edge portions and said overlapping section, and an opaque coating is printed on said opaque section.

4. A packaging bag as claimed in claim 3, wherein said opaque section covers an operation member of said lens-fitted photo film unit.

5. A packaging bag as claimed in claim 4, wherein said operation member is at least one of a flash-switching member, a shutter release button, or a winder wheel.

6. A packaging bag as claimed in claim 2, wherein said window section makes a part of a front portion of said lens-fitted photo film unit observable, and said taking lens is provided on said front portion.

7. A packaging bag as claimed in claim 6, wherein said window section makes a part of an upper portion and a part of a bottom portion observable.

8. A packaging bag as claimed in claim 7, wherein a part of a front cover of said lens-fitted photo film unit is observable through said window section.

9. A packaging bag as claimed in claim 8, wherein said front cover is made of white plastic so as to reflect sunlight passed through said window section to prevent that a temperature inside said packaging bag rises.

10. A packaging bag as claimed in claim 3, said sheet-type material comprising:

an inner plastic film layer having light transmittance; and an outer plastic film layer being laminated on said inner plastic film layer, said outer plastic film layer having light transmittance.

11. A packaging bag as claimed in claim 10, wherein printing is applied to said inner plastic film layer, and said printing is covered by said outer plastic film layer.

12. A packaging bag as claimed in claim 11, wherein said printing on said opaque section includes ornamental printing.

13. A packaging bag as claimed in claim 12, wherein a part of said inner plastic film layer, corresponding to said window section, is printed half-tone dot meshing with a white coating or a matte coating.

14. A packaging bag as claimed in claim 12, wherein said outer plastic film layer is a PET film layer with a matte finish.

15. A transparent packaging bag for packaging a lens-fitted photo film unit, said transparent packaging bag having a tube-shape made of a sheet-type material, both end portions of said transparent packaging bag being sealed for wrapping said lens-fitted photo film unit, said transparent packaging bag comprising:

a sealing section for shaping said sheet-type material into said tube-shape, said sealing section being formed by adhering insides of both side edge portions of said sheet-type material, said side edge portions being opaque;

an opaque overlapping section being strip-shaped and being adjacent to one of said side edge portions of said sheet-type material, said sealing section being foldable to overlay on said overlapping section, said overlapping section covering a taking lens of said lens-fitted photo film unit packaged by said transparent packaging bag and extending over an entire length of said transparent packaging bag;

a window section for making at least a front part of said lens-fitted photo film unit observable from outside; and an opaque section surrounding said window section, said opaque section being a section other than said sealing section and said overlapping section.

16. The transparent packaging bag as claimed in claim 15, wherein said overlapping section is placed across said window section, so as to separate said window section in two parts.

17. The transparent packaging bag as claimed in claim 15, wherein said sheet-type material comprises:

an inner plastic film layer having light transmittance; and an outer plastic film layer being laminated on said inner plastic film layer, said outer plastic film layer having light transmittance.

* * * * *